United States Patent Office 3,067,415
Patented Dec. 4, 1962

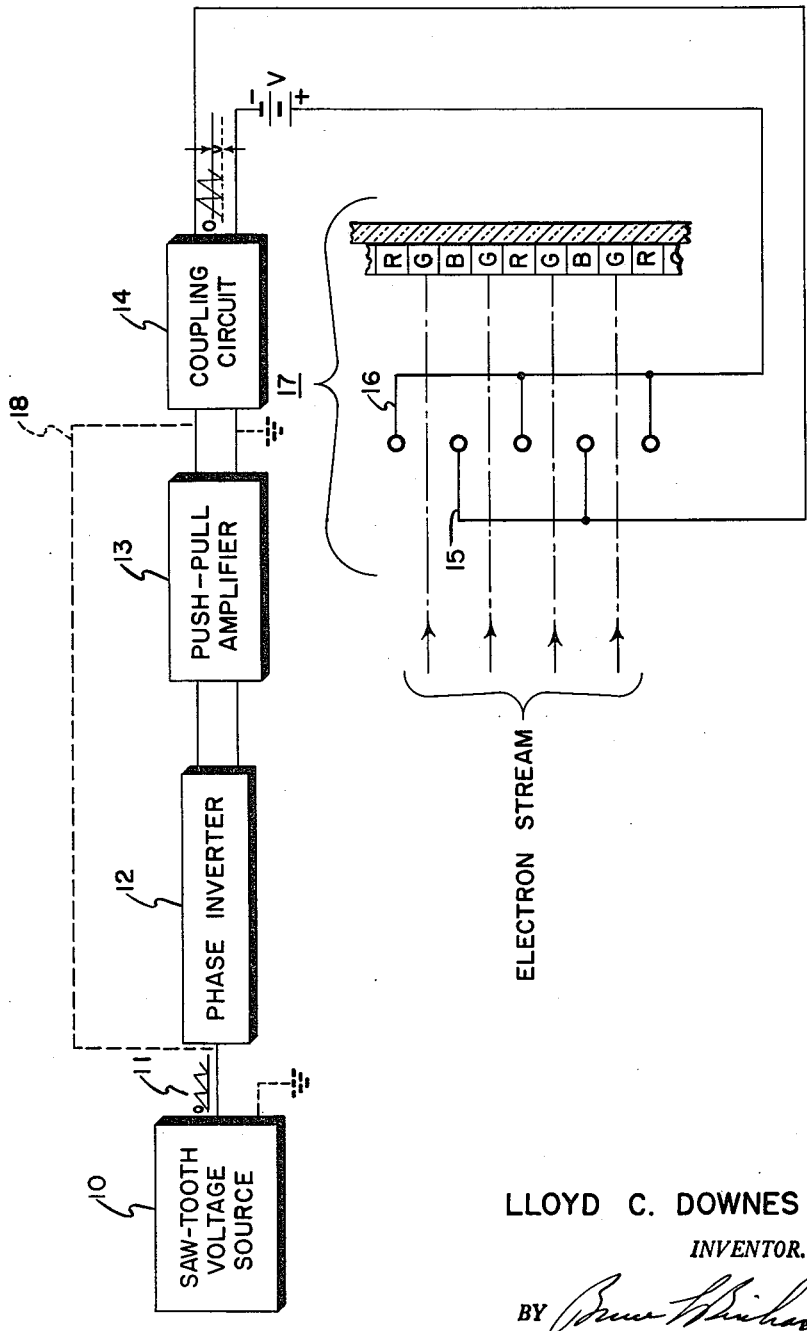

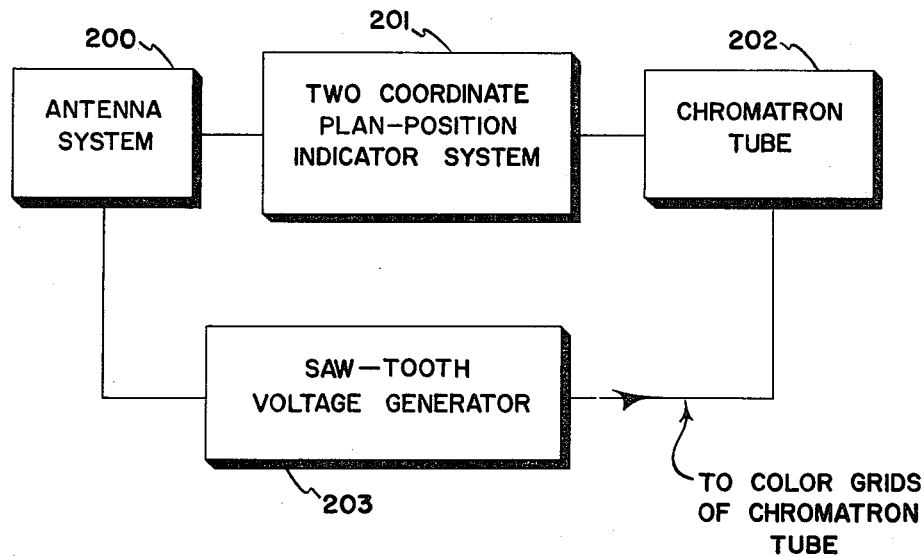
FIG.-2-
LLOYD C. DOWNES
*INVENTOR.*
BY
HIS ATTORNEY

3,067,415
COLOR REPRODUCTION OF RADAR INFORMATION AND METHOD FOR ACCOMPLISHING SAME OR THE LIKE
Lloyd C. Downes, Los Angeles, Calif., assignor to Hoffman Electronics Corporation, a corporation of California
Filed Oct. 26, 1954, Ser. No. 464,769
5 Claims. (Cl. 343—5)

This invention is related to radar displays and, more particularly, to an improved radar display system in which detected information is distinguishable by color differentiation.

In the past, radar systems have utilized black-and-white CRT tubes, in the main, to display desired information concerning the position of detected objects relative to the observer. Normally, two CRT indicator tubes are employed to give the complete positioning in space of a given object. One of the indicators would be a plan position indicator (P.P.I. scope), and the other CRT indicator tube would be a range-height indicator (R.H.I. indicator), or, as an alternative, a CRT indicator giving range and elevation angle. It would of course be desirable to employ only one indicator tube, provided it were possible to display the complete positioning information of a detected object on that tube alone.

Therefore, it is an object of this invention to provide a method for displaying radar information in such a way that the spatial positioning of a detected object may be seen from the pattern on one CRT indicator tube.

It is a further object of this invention to provide a method for displaying radar information so that at least one of the positioning coordinates of a detected object may be shown in a unique color, so as to provide for information discrimination by means of color differentiation.

According to the present invention, the method of displaying radar information by color differentiation includes the steps of generating a signal having a saw-tooth wave form the amplitude of which is related to the magnitude of a chosen coordinate of a detected object relative to the position of the observer, and applying this saw-tooth signal across the color grids of a color image tube. In this disclosure and in the appended claims, such a tube (for example of the type designated by the trademark "Chromatron") shall be understood to include all present and future color tubes in which are employed a plurality of parallel, adjacent, multi-color phosphor strips and a plurality of parallel grid wires each spaced in proximity with and parallel to its associated phosphor strip. By the aforementioned basic method, three coordinate information, e.g., range, azimuth and elevation, may be displayed in a single plan position indicator system by the employment of a color tube as the P.P.I. scope.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

FIGURE 1 is a block diagram of one embodiment of the subject invention.

FIG. 2 is a block diagram showing the circuit of FIG. 1 incorporated in the system as a whole.

In FIGURE 1 saw-tooth voltage source 10 generates saw-tooth signal 11 and is coupled to phase inverter 12. Phase inverter 12 drives a push-pull amplifier 13 the output from which feeds through coupling circuit 14 to color grids 15 and 16 of color tube 17. The output saw-tooth signal from coupling circuit 14 is displaced downward so that its zero voltage reference level is displaced a voltage V below the actual zero voltage line, by reason of the insertion of battery B (or other source of positive voltage with the polarity shown) between one output lead from coupling circuit 14 and color grid 16 of Chromatron tube 17.

The circuit of FIGURE 1 operates as follows. Output signal 11 from saw-tooth voltage source 10 has its voltage reference level at zero voltage (see the wave form in FIGURE 1). It may be true that signal 11 has sufficient maximum amplitude to drive color grids 15 and 16 of color tube 17 directly, as is indicated by wire lead 18 in which case phase inverter 12 and push-pull amplifier 13 would be deleted. In the practical case, however, this will not be true. Hence, phase inverter 12 and push-pull amplifier 13 are provided in the circuitry of FIGURE 1 to amplify saw-tooth signal 11 as desired. Physically, the radar antenna scan will be synchronized with saw-tooth signal 11 in a conventional manner. Let it be assumed for the moment that it is desired to display information received during the vertical scan of the antenna. Further, let it be assumed that signal 11 is at its zero voltage level when the elevation angle of the antenna beam is zero. Then, in the absence of a positive voltage being inserted between color grid 16 and coupling circuit 14, electrons from the electron gun of color tube 17 will impinge upon the green phosphor strips, initially, and will gradually move transversely so as to impinge upon the red phosphor strips as saw-tooth signal 11 approaches its maximum amplitude. Thus, by this invention, a two-color height indicator is provided. Hence, assuming a signal from coupling circuit 14 of proper amplitude, objects appearing, for example, above an elevation angle of 45° will appear as red objects on the color tube while objects with an elevation angle of less than 45° from the observer will appear as green objects to the color tube observer. If the electron stream is very narrow in comparison to the width of the phosphor strips, and if the voltage from voltage source V is of appropriate magnitude, then, as the antenna beam starts from zero elevation angle and proceeds through its scan, the electron stream of color tube 17 will have its initial impingement upon the blue phosphor strips and subsequently scan transversely through the blue and green phosphor strips to finally appear upon the red phosphor strips, when the amplitude of saw-tooth signal 11 and the antenna scan reach their maximum. Such a system would constitute a three-color elevation angle system. For example, objects having an elevation angle less than 30° with respect to the horizon would appear at the proper range and azimuth as blue traces on the color tube. Objects having an elevation angle between 30° and 60° would appear as green traces. And objects having an elevation angle greater than 60° would appear as red traces. Should it be desired, the vertical antenna scan might appear as a complete spectrum of colors. This could be accomplished if the width of the electron stream were adjusted to be equal, or nearly equal, to the width of the color tube phosphor strips.

The manner in which a color tube can be used as a conventional P.P.I. and to also provide information as to elevation is as follows:

As the antenna is rotated horizontally and also reciprocated vertically about a horizontal axis, the beam of the color tube is deflected radially at a frequency much greater than the vertical reciprocation of the antenna to produce a radial trace on the face of the tube, which trace is rotated angularly about its axis in synchronism with the horizontal scan of the antenna. As is well known, a signal received at the antenna will modulate a control electrode of the tube to provide a luminous spot along the radial trace to provide an indication of range while the angular position of the trace with respect to a reference point will indicate azimuth. The vertical reciprocation of the antenna 200 is synchronized with the saw-tooth voltage generator 10 or 203 such that the amplitude of the saw-tooth voltage is proportional to the angle of elevation. At zero angle of elevation of the antenna, the generated saw-tooth voltage is zero and is maximum at the maximum angle of antenna elevation. As described above, the saw-tooth voltage at the output of coupling circuit 14 operates together with battery B to vary the bias on the grids 15, 16 to deflect the beam away from one grid or the other or from neither grid so as to cause the beam to impinge upon one of the color strips as the beam is deflected radially by the usual deflecting system of the cathode ray tube. When a target echo signal is received it will produce a bright spot somewhere along the trace to indicate range and in a color dependent on the amplitude of the saw-tooth voltage at that instant which in turn is dependent on the angle of elevation of the antenna.

This invention is not restricted to applications involving vertical radar scanning, but must be understood to include all types of radar scanning since the generation of a variable amplitude voltage can be coordinated with such other types of scanning in order to provide information by color differentiation in accordance with the teachings of this invention.

From the above, it is seen that this invention is of special value in registering three-coordinate position information simultaneously on the same indicating device. See for example FIGURE 2. In FIGURE 2 antenna system 200 is coupled through two coordinate, plan-position indicator system 201 to the input circuitry of Chromatron tube 202. Antenna system 200 is also coupled through saw-tooth voltage generator 203 to the color grids of Chromatron tube 202.

The circuit shown in FIGURE 2 operates as follows. The instantaneous, two-coordinate, radar information received by antenna system 200 is translated in a conventional manner to two coordinate, plan-position indicator system 201 for processing, the processed signal therefrom being fed into the input circuit of Chromatron tube 202. The system as is thus far described, with the exception of the employment of the Chromatron tube, operates the same as any conventional PPI radar system. But, in addition, however, a saw-tooth voltage is generated by generator 203 the instantaneous magnitude of which is related to the degree of instantaneous disposition of antenna system 200 with respect to a third coordinate, this saw-tooth voltage being applied, as in FIGURE 1, to the color grids of the Chromatron tube. Hence three coordinate radar information, such as range, azimuth, and elevation of a detected object may be displayed in a two (x—y) coordinate display on the face of Chromatron tube 202 with the color of the display representing the third coordinate information, and this with the employment of but a single display tube.

Thus, by a single indicating means (a Chromatron tube), the observer may at a glance determine range, azimuth and approximate elevation. It is to be noted that the color information presented would supply only very approximate elevation or elevation angle, but this information will be sufficient for ground observation and general radar work. The method devised will materially reduce the cost of radar systems, by eliminating the need for a second radar scope and the circuitry associated therewith.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a radar system having an antenna movable along at least one coordinate of a coordinate system, means for generating a saw-tooth voltage, the amplitude of which varies in accordance with the position of the antenna in said one coordinate, a cathode ray tube having a plurality of colors to be illuminated by the beam and means responsive to the amplitude of the saw-tooth voltage for selecting the color to be illuminated by the beam to indicate the position of the antenna in the one coordinate.

2. In a radar receiving system having an antenna movable in at least one coordinate of a coordinate system, means for generating a saw-tooth voltage, the amplitude of which varies in accordance with the position of the antenna in said one coordinate, a cathode ray tube having a plurality of colors to be illuminated by the beam, means for deflecting said beam to provide a linear trace, means responsive to a received signal for modulating the beam, and means responsive to the amplitude of the saw-tooth voltage for selecting the color to be illuminated by the beam to indicate the position of the antenna, upon receipt of a signal, in the one coordinate.

3. In a radar receiving system having an antenna movable along two transverse coordinates and an indicator including a cathode ray beam tube having means for deflecting the beam radially to provide a trace along which a received echo signal may be displayed to indicate the range, and having further means for deflecting the radial trace angularly about its axis in accordance with the movement of the antenna along one coordinate to indicate the azimuthal position of the displayed signal, the improvement comprising means for generating a saw-tooth voltage, the amplitude of which varies in accordance with the position of the movable antenna in the other coordinate, the cathode ray beam tube having a plurality of different colors to be illuminated by the deflected beam, and means responsive to the amplitude of the saw-tooth voltage for selecting the color to be illuminated by the beam to indicate the position of the antenna along the other coordinate.

4. In a radar receiving system having an antenna movable about horizontal and vertical axes and a cathode ray tube having means for deflecting the beam radially to provide a trace along which a received echo may be displayed to indicate the range and having further means for deflecting the radial trace angularly about its axis in accordance with the movement of the antenna about its vertical axis to provide an indication of the azimuthal position of the displayed signal, the improvement comprising means for generating a saw-tooth voltage, the amplitude of which varies in accordance with the position of the movable antenna about the horizontal axis, the cathode ray tube having a plurality of different colors to be illuminated by the deflected beam, and means responsive to the amplitude of the saw-tooth voltage for selecting the color to be illuminated by the beam to indicate the angle of elevation of the antenna.

5. A radar receiving system in accordance with claim 4, in which the screen of the cathode ray tube includes a plurality of strips of fluorescent material, adjacent strips being of different color when activated by the beam, and the means for selecting the color comprising grids adjacent said strips biased by the saw-tooth voltage to cause the beam to impinge on strips of one color in accordance with the amplitude of the voltage.

References Cited in the file of this patent

UNITED STATES PATENTS

| | | |
|---|---|---|
| 2,508,358 | Ayres | May 23, 1950 |
| 2,648,061 | Parker | Aug. 4, 1953 |
| 2,705,257 | Lawrence et al. | Mar. 29, 1955 |
| 2,759,993 | Loughlin | Aug. 21, 1956 |